…

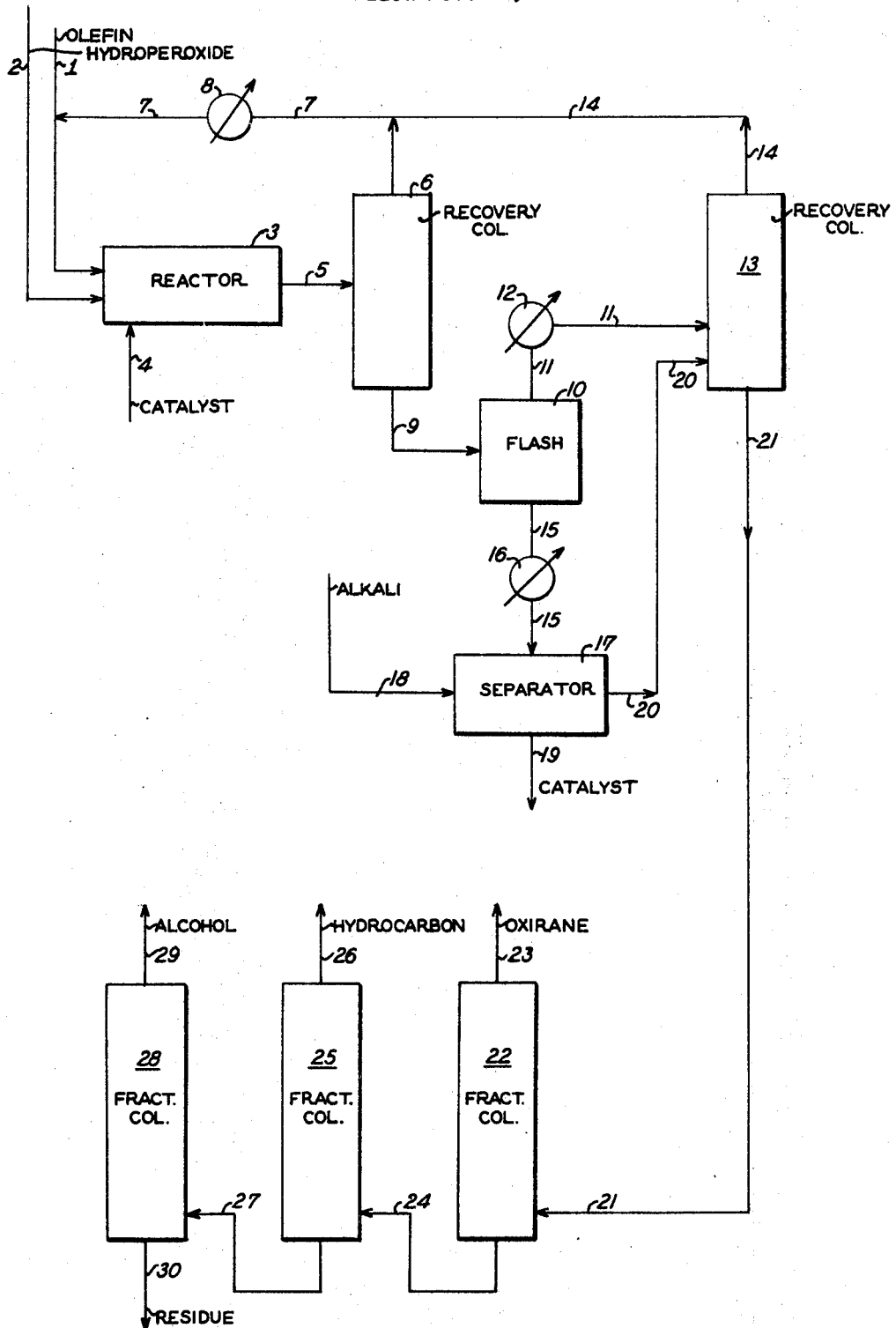

United States Patent Office 3,523,956
Patented Aug. 11, 1970

3,523,956
PROCESS FOR PREPARING
OXIRANE COMPOUND
Richard Kaplan, North White Plains, N.Y., assignor to Halcon International, Inc., a corporation of Delaware
Filed Nov. 23, 1966, Ser. No. 596,639
Int. Cl. C07d 1/06
U.S. Cl. 260—348.5                                    5 Claims

ABSTRACT OF THE DISCLOSURE

The present disclosure relates to a process for preparing an oxirane compound by reacting an olefin with an organic hydroperoxide wherein the reactor effluent is treated to remove catalyst before recovery of by-product alcohol.

BACKGROUND OF THE INVENTION

The production of oxirane compounds by reacting an olefin with an organic hydroperoxide is known. Details of the reaction are disclosed in copending applications (Ser. No. 523,895, filed Feb. 1, 1966, now U.S. Pat. No. 3,468,-099 and Ser. No. 536,179, filed Mar. 14, 1966, now U.S. Pat. No. 3,375,362). During the reaction the organic hydroperoxide oxidizes the olefin to the olefin oxide and is itself converted to an alcohol. The reaction is carried out at the temperatures in the range of from about −20 C. to about 200° C., preferably from about 0° C. to about 150° C., and most preferably at temperatures of from about 50° C. to about 120° C. The reaction is conducted under pressures sufficient to maintain a liquid phase. While sub-atmospheric pressures may be employed, the pressures are preferably from about atmospheric to about 1000 p.s.i.g. Generally, the molar ratio of olefin to hydroperoxide varies within the range of from about 0.5–100:1, preferably 1–20:1, and most preferably 2–10:1. The reaction may be carried out in one or more reaction vessels connected in series or in parallel.

The reaction is conducted in the presence of an effective amount of a catalyst selected from a group consisting of Ti, V, Cr, Se, Zr, Nb, Mo, Rh, Te, Ta, W, or U. The catalysts are suitably added as compounds of the foregoing metals; it is possible, however, to add the catalyst in the form of finely divided metal. In this case the metal is eventually converted to a compound sufficiently soluble to provide a catalytic amount of the metal in solution in the reaction mixture.

The amount of metal in solution used as catalyst in the epoxidation process can be varied widely, although as a rule it is desirable to use at least about 0.00001 mol. and preferably from about 0.002 to about 0.03 mol per mol of hydroperoxide present. Amounts as low as 0.000001 mol per mol of hydroperoxide have an effect while amounts greater than about 0.1 mol appear to give no advantages over smaller amounts, although amounts up to 1 mol or more per mol of hydroperoxide can be employed. The catalyst remains dissolved in the reaction mixture throughout the process and can be reused in the reaction after removal of the reaction products therefrom. Molybdenum, titanium, vanadium, and tungsten are preferred catalysts. The molybdenum compounds include molybdenum organic salts, oxides such as $Mo_2O_3$ and $MoO_3$ molybdic acid, molybdenum chlorides and oxychlorides, molybdenum fluoride, phosphate, sulfide, and the like. Hetero-polyacids containing molybdenum can be used as well as salts thereof; examples include phosphomolybdic acid and the sodium and potassium salts thereof. Similar or analogous compounds of the other metals mentioned may be used, as may mixtures thereof.

The effluent from the reactor is processed by distillation or other methods to recover the olefin oxide and the by-product alcohol formed during the reaction. During the processing the alcohol dehydrates to an olefin although the reason for this dehydration has not heretofore been known. This dehydration of the alcohol is undesirable since the resulting olefin is often very difficult to separate from the other constituents and is liable to polymerize under the processing conditions resulting in severe equipment fouling. The dehydration also reduces yields of the alcohol which is a recoverable by-product and which, if desired, may be dehydrated at a particular stage of the process under controlled conditions.

In addition to dehydration of the alcohol, another problem in the preparation of oxirane compounds by reacting an olefin with an organic hydroperoxide is the susceptibility of the oxirane compound to undergo further reaction and of formation of by-products which are capable of decomposing the oxirane compound, and which due to their corrosive nature have heretofore necessitated the use of stainless steel equipment. In order to minimize the decomposition of the oxirane compound and the dehydration of the alcohol, it has been necessary heretofore to carry out the recovery and purification of the oxirane compound and recoverable by-products at relatively low temperatures and pressures. The low pressures have necessitated considerable refrigeration equipment and the use of vacuum distillation procedures in at least part of the olefin recovery system, and in the oxirane product recovery system.

OBJECTS OF THE INVENTION

Accordingly, it is an object of the present invention to provide a new and improved process for the preparation of oxirane compounds formed by reacting an olefin with an organic hydroperoxide. Another object is to reduce the amount of dehydration of the alcohol formed by the reaction between the olefin and the organic hydroperoxide. Another object is to permit the recovery and purification of product and of recoverable by-products to be carried out in fewer steps and with less expensive equipment and fewer major equipment items than heretofore possible. Still another object is to lessen the requirement of refrigeration, and vacuum in the unreacted olefin and oxirane product recovery systems.

BRIEF SUMMARY OF THE INVENTION

It has now been found that the dehydration of the alcohol is catalyzed by the presence of the epoxidation catalyst in the reactor effluent, and that removal of catalyst from the system prior to recovery of by-product alcohol increases the versatility of the desired oxirane compound, substantially lessens alcohol dehydration and permits the recovery of the desired oxirane compound and recoverable by-product to be effected in a greatly simplified and more effective manner. It has been found that removal of the catalyst decreases the amount of dehydration of the alcohol by a factor of from about 50 to about 100. The catalyst may be removed in a variety of ways. The manner in which it is removed is not critical. It may be removed, for example, by treating the reactor effluent with a basic material, or with ion-exchange resins, by adsorption, by chelation, by clothration, by distillation, by crystallization, or by precipitation. Removal of the catalyst minimizes decomposition of the oxirane product, minimizes formation of undesirable by products and permits recovery of oxirane product and recoverable by-products to be effected in fewer steps and with fewer major equipment and with less expensive equipment.

DESCRIPTION OF REACTANTS

The present invention is uniquely adapted for this successful conversion of propylene to propylene oxide. In addition to propylene, however, the reaction system of the present invention can also be applied generally to the expoxidation of olefins and substituted olefins.

Preferred compounds are those having from about 2 to 30 carbon atoms, and preferably at least 3 carbon atoms. Illustrative olefins are ethylene, propylene, normal butylene, isobutylene, the pentenes, the methyl pentenes, the normal hexenes, the octenes, the dodecenes, cyclohexene, methyl cyclohexene, butadiene, styrene, methyl styrene, vinyl toluene, vinylcyclohexene, and phenyl cyclohexenes, and the like. Substituted olefins wherein the substituent is halogen, oxygen, sulfur and the like can be used. Such substituted olefins are illustrated by allyl alcohol, methallyl alcohol, cyclohexene, diallyl ether, methyl methacrylate, methyl oleate, methyl vinyl ketone, allyl chloride, and the like. In general, all olefins and substituted olefins epoxidized by methods previously employed can be epoxidized in accordance with this process including olefinically unsaturated materials having up to about several thousand carbon atoms. Illustrative materials are linseed oil, olive, oil, soybean oil, cottonseed oil, tall oil, castor oil, corn oil, butylpolyglycol esters of unsaturated fatty acids, liquid or solid polybutadiene, polyisoprene, unsaturated copolymers of ethylene and including terpolymers thereof with cyclopentadiene and the like.

The lower olefins having about 3 or 4 carbon atoms in an aliphatic chain are advantageously epoxidized by this process. The class of olefins commonly termed alpha olefins or primary olefins are epoxidized in a particularly efficient manner by this process. It is known to the art that these primary olefins, e.g., propylene, butene-1, decene-1, hexadecene-1, etc., are much more difficultly epoxidized than other forms of olefins, excluding only ethylene. Other forms of olefins which are much more easily epoxidized are substituted olefins, alkenes with internal unsaturation, cycloalkenes and the like. For example, it has been found that cyclohexene is easily epoxidized with all the metals cited in this disclosure. However, it has been discovered that three of the catalysts cited have particular utility in the epoxidation of a primary olefin such as propylene. These three catalysts are molybdenum, titanium, and tungsten. It has been discovered that their activity for epoxidation of the primary olefins is surprisingly high and can lead to high selectivity of propylene to propylene oxide. These high selectivities are obtained at high conversions of hydroperoxide, 50% or higher, which conversion levels are important for commercial utilization of this technology.

THE ORGANIC HYDROPEROXIDE

The reaction of this invention is carried out broadly using an organic hydroperoxide reactant having the formula ROOH wherein R is an organic radical. In preferred practice R is a substituted or unsubstituted alkyl, cycloalkyl, aralkyl, aralkenyl, hydroxyaralkyl, cycloalkenyl, hydroxycycloalkyl, and the like radical having about 3 to 20 carbon atoms. R may also be a Heterocyclic radical.

Illustrative and preferred hydroperoxides are cumene hydroperoxide, ethylbenzene hydroperoxide, tertriary butyl hydroperoxide, cyclohexanone peroxide, tetrahydronaphthalene hydroperoxide, methylethyl ketone peroxide, methylcyclohexene hydroperoxide, and the like as well as the hydroperoxides of toluene, p-ethyl toluene, isobutylbenzene, diisopropyl benzene, p-isopropyl toluene, o-xylene, m-xylene, p-xylene, phenyl cyclohexane, etc. A useful organic hydroperoxide compound for use in this invention is the peroxide product which is formed by the liquid phase molecular oxygen oxidation of cyclohexanol.

Particularly useful hydroperoxides are derived from alkylaromatic hydrocarbons having at least one hydrogen atom on a carbon adjacent to the ring. Alpha aralkyl hydrocarbons which are used in this invention have the general formula

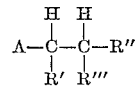

wherein each R', R" and R''' can be hydrogen or an alkyl radical preferably having 1 to 20 carbon atoms, and A is an aromatic ring. The aromatic ring, A, may be that of benzene and may be substituted with fluoro, chloro, bromo, nitro, alkoxyl, acyl or carboxy (or esters thereof) groups. The aromatic ring may have one or more side chains with up to twelve carbon atoms in each chain, which chains may be normal or branched. The alpha aralkyl hydroperoxides have the formula

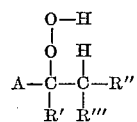

wherein R', R", R''' and A are as above mentioned. Examples are the hydroperoxides of toluene, ethylbenzene, cumene, p-ethyltoluene, isobutylbenzene, tetralin, diisopropylbenzene, p-isopropyltoluene, o-xylene, m-xylene, p-xylene, phenylcyclohexene, and the like. The preferred species are those derived from cumene, i.e., alpha, alpha dimethyl benzyl hydroperoxide, and ethyl benzene, i.e., alpha phenyl ethyl hydroperoxide. These aralkyl hydroperoxides give better reaction selectivities and faster reaction rates.

Most preferably, in the present invention the hydroperoxides are prepared through oxidation of the corresponding hydrocarbon. The oxidation is carried out using molecular oxygen as provided by air although pure oxygen as well as oxygen in admixture with insert gas in greater or lesser concentrations than air can be used. Oxidation temperatures broadly in the range 40° to 180° C., preferably 90° to 140° C. and pressure of 15 to 1,000 p.s.i. and preferably 30 to 150 p.s.i.a. can be used. The oxidation is continued until about 1 to 70%, and preferably about 10 to 50% of the alkylaromatic has been converted to the hydroperoxide.

Various additives of known type can be employed during the alkylaromatic oxidation to promote hydroperoxide production.

The hydrocarbon oxidation effluent comprises a solution of the hydroperoxide in hydrocarbon along with some alcohol formed during the oxidation. This effluent can be employed in the epoxidation without concentrating the hydroperoxide, or the oxidation effluent can be distilled to first concentrate the hydroperoxide.

THE CATALYST

The catalysts which have been identified previously are suitably added as compounds; it is possible, however, and preferred to add the catalyst as finely divided metal in which case the metal is eventually converted to a compound sufficiently soluble to provide a catalytic amount of the metal in solution in the reaction mixture.

The amount of metal in solution used as catalyst in the epoxidation process can be varied widely, although as a rule it is desirable to use at least 0.00001 mol and preferably 0.002 to 0.03 mol per mol of hydroperoxide present. Amounts as low as 0.000001 mol per mol of hydroperoxide have an effect while amounts greater than 0.1 mol seem to give no advantage over smaller amounts, although amounts up to 1 mol or more per mol of hydroperoxide can be employed.

The catalytic components may be employed in the epoxidation reaction in the form of a compound or mixture which is initially soluble in the reaction medium. While solubility will, to some extent depend on the particular reaction medium, employed, a suitably soluble substance contemplated by the invention would include hydrocarbon soluble, organo-metallic compounds having a solubility in methanol at room temperature of at least 0.1 gram per liter. Illustrative soluble forms of the catalytic materials are the naphthenates, stearates, octoates, carbonyls and the like. Various chelates, association compounds and enol salts, such, for examples, as acetoacetnates may be also used. Specific and preferred catalytic compounds of this type for use in the invention are the naphthenates and carbonyls of molybdenum, titanium, tungsten, rhenium, niobium, tantalum, selenium, chromium, zirconium, tellurium and uranium. Alkoxy compounds such as tetrabutyl titanate and like tetra alkyl titanates are very useful.

Molybdenum, tungsten, vanadium, and titanium form an outstanding and preferred subgroup of catalysts since these catalysts are exceptionally useful in the epoxidation of primary olefins such as propylene as well as all of the other olefins.

A second subgroup which is not quite as useful with primary olefins as the above but which is quite useful with other olefin types is comprised of niobium, tantalum, uranium at least useful of the enumerated catalysts.

CATALYST REMOVAL

As indicated previously the catalysts may be separated from the reactor effluent in a variety of ways. Removal by treatment with a basic material is preferred because of the ease with which the separation is effected. Suitable basic materials are alkaline compounds of the alkali metals and the alkaline earth metals. Specific examples of common suitable alkalis are LiOH, NaOH, KOH, $NH_4OH$, $Be(OH)_2$, $Mg(OH)_2$, and $Ca(OH)_2$. Other suitable basic materials are the oxides, carbonates, and bicarbonates of the metals of Groups I and II of the Periodic Table. Organic bases, e.g., alkyl amines, such as mono-, di-, or triethanolamine may also be used. The basic material may be added as such or may be formed in situ. The basic material reacts ith the catalyst and removes the latter from the reactor effluent. The reactor effluent may be treated with the basic material in any convenient or suitable manner, such as, for example, by direct mixing of solid basic material with the reactor effluent, or by mixing a solution of the basic material with the reactor effluent in a co-current or counter-current manner. The effect of the latter contacting method is to form an upper catalyst-free organic phase and a lower catalyst-containing aqueous phase. The two phases are readily separated, for example, by decanting. Amount of alkali should be sufficient to remove all of the metallic catalyst from the reactor effluent and to neutralize acidic by-products. The concentration of the alkaline solution may vary from about 0.001 N up to the pure basic material in solid form. Preferably, the concentration of the solution will be from about 0.1 N to about 2 N.

Treatment of the reactor effluent with the basic material may take place at temperatures of from about 10° C. to about 200° C., preferably from about 25° C. to about 100° C. It has been found advantageous to recycle part of the basic solution from the effluent of the catalyst removal step to the feed of the catalyst separation step. Such cycle improves the contacting between reactor effluent and basic material and reduces the net consumption of the latter. In addition, where the basic material is employed in the form of an aqueous solution, the solubility of the oxirane compound in the aqueous phase is reduced by the presence of soluble salts which accumulate in the recycled alkaline solution. Higher concentrations of alkali, while effective, tend to increase the loss of oxirane product due to hydrolysis. The separated catalyst may, of course, be recovered and recycled if desired.

Surprisingly, it has been found that aqueous alkaline treatment causes no appreciable decom position of the oxirane compound by hydrolysis. Treating the reactor effluent with aqueous alkali has outstanding and unexpected process advantages. By eliminating the catalyst, it prevents dehydration of the alcohol. This permits the process recovery system to be operated at higher temperatures and pressures since the problem of olefin polymerization is eliminated. At the same time the recovery and purification of oxirane product and of recoverable by-products is vastly simplified. A number of separation steps and many major equipment items, e.g., fractionation columns and vaporizers are eliminated. In addition it is possible to use carbon steel, in place of stainless steel.

DETAILED DESCRIPTION

The present invention will now be described with reference to the accompanying drawing which illustrates one embodiment of the process.

The reactants, olefin and hydroperoxide, and catalyst are fed to reactor 3. Olefin may be passed in via conduit 1, hydroperoxide via conduit 2 and catalyst via conduit 4. Any suitable alternative methods of feeding the charge materials may be employed. For example, the catalyst, instead of being fed separately, may be combined with either the olefin or hydroperoxide, and all charge materials may be fed to the reactor via a common duct.

The reactor effluent containing unreacted olefin, oxirane product and hydrocarbon and alcohol by-product is passed via conduit 5 to olefin recovery column 6. Unreacted olefin is taken overhead via conduit 7 containing condenser 8 and recycled to reactor 3 via conduit 1. The bottoms from column 6 are passed via conduit 9 to flash tank 10 wherein additional unreacted olefin is taken overhead and passed via conduit 11 containing condenser 12 to a second olefin recovery column 13. The bottoms from flash tank 10 are passed via conduit 15 containing condenser 16 to catalyst separator 17. An aqueous alkaline solution is introduced to separator 17 via conduit 18. A lower aqueous catalyst-containing phase is removed via conduit 19 and an upper organic catalyst-free phase is removed via conduit 20 and passed to olefin recovery column 13 wherein the final portion of unreacted olefin is removed. The unreacted olefin separated in column 13 from material fed via conduits 11 and 20 is taken overhead via conduit 14 and passed into conduit 7.

In another embodiment (not sohwn) the flash tank may be eliminated and the bottoms from column 6 passed directly to separator 17. Also, while the drawing illustrates removal of catalyst by an aqueous alkaline treatment, other methods of removal are operable and contemplated in the scope of the present invention. Thus, instead of an aqueous alkaline treatment, the catalyst could be removed by any of the alternative means mentioned above, for example, by subjecting the reactor effuent to treatment with an ion-exchange resin, chelation, etc.

The bottoms from column 13 are passed via condiut 21 to fractionating column 22 from which oxirane product is taken overhead via conduit 23. The bottoms are passed via conduit 24 to fractionating column 25 from which hydrocarbon is taken overhead via conduit 26. The bottoms from column 25 are passed via conduit 27 to fractionating column 28 from which by-product alcohol is taken overhead via column 29 and heavy end residues are withdrawn as bottoms via conduit 30.

It will be appreciated by those skilled in the art that the catalyst separation may take place at any point downstream of the reactor and upstream of the alcohol fractionation. The greatest benefit in terms of maximum yield of product and recoverable by-products, elimination of equipment fouling, reduction in major equipment items such as fractionating columns, and the ability to use equipment fabricated from carbon steel rather than stainless steel is obtained when the catalyst is removed as soon as possible downstream of the reactor. Nevertheless, benefits and advantages are obtained even when the catalyst is separatd from the reactor effluent just prior to the by-product alcohol recovery step.

The advantages of the present process in the embodiment just described are of major economic importance.

Fractionating column 22, 25 and 28 are made of carbon steel rather than stainless steel. The hydrocarbon separation is effectd in one column instead of the two heretofore necessary, as higher temperatures and pressures can be used. In addition the requirement of at least two vaporizers between the hydrocarbon and alcohol fractionation columns is eliminated. Still another advantage associated with the use of higher temperatures and pressures is the elimination of lessening of refrigeration equipment in the second propylene recovery column 13.

EXAMPLE 1

Ethylbenzene is oxidized with air at 140° C. in the liquid phase to a concentration of 12 wt. percent ethylbenzene hydroperoxide. Several portions of this hydroperoxide solution are epoxidized with propylene in 150 cc. stainless steel bombs. The charge to each bomb is 80 g. of hydroperoxide solution, 15 g. of propylene, and 0.6 g. of a solution containing 0.3 wt. percent of dissolved molybdenum metal. The epoxidation reaction is carried out for 75 minutes at 120° C. The average conversion is about 97% of the hydroperoxide, with average yields of 72 g.-mols propylene oxide and 83 g.-mols alpha-phenylethanol per 100 g.-mols ethylbenzene hydroperoxide reacted. After epoxidation the bombs are cooled, unreacted propylene is distilled out of the mixture, and the remaining liquid portions from each bomb are combined to form a single epoxidation effluent.

A 100 g. portion of this epoxidation effluent is mixed with 5 g. of 1 N NaOH, shaken for 15 minutes in a separatory funnel at ambient temperature, and the phases are separated. Analysis of the organic phase shows that the molybdenum has been completely removed by the alkaline treatment. Analyses of the aqueous and organic phases show that the losses of products during the alkaline treatment are 0.4% of the alpha-phenyl ethanol (by dissolving in the aqueous phase) and 2% of the propylene oxide (primarily by hydrolysis to propylene glycol). About 41% of the phenol in the epoxidation effluent is removed from the organic phase.

EXAMPLE 2

A second 100 g. portion of epoxidation effluent from Example 1 is mixed with 5 g. of a 1 N NaOH solution that had been previously saturated with soduim benzoate. The mixture is shaken for 15 min. at ambient temperature, and the phases are separated. Analyses of the organic phase shows that the molybdenum has been completely removed by the alkaline treatment. Analyses of the aqueous and organic phases show that the losses of products during the alkaline treatment are about 2% of the alpha-phenyl ethanol, 2% of the acetophenone and 1–2% of the propylene oxide.

A portion of the alkaline-treated organic phase is distilled in a micro-column to remove propylne oxide and ethylbenzene, and portions of the still bottoms comprising mainly alpha-phenyl ethanol with some acetophenone and high boiling residues, are held at elevated temperatures to measure the rate of dehydration of the alpha-phenyl ethanol. One portion showed no detectable decomposition of alpha-phenyl ethanol in 2 hours at 155° C. A second portion showed less than 1%/hour decomposition of alpha-phenyl ethanol at 165° C. In contrast to these very low dehydration rates, a similar effluent which had not been treated with alkaline material showed 9.6%/hour decomposition of alpha-phenyl ethanol at 145° C.

What is claimed is:

1. In a process for preparing an oxirane compound by catalytically reacting an olefin with an organic hydroperoxide wherein by-product alcohol is formed, the improvement which comprises separating unreacted olefin from the reaction effluent and subsequently removing at least part of the catalyst from the remaining reactor effluetn by contacting said effluent at 10° C. to about 200° C. with an aqueous basic solution, separating the resulting mixture into an organic phase and an aqueous catalyst containing phase and recovering said alcohol from said organic phase.

2. A process according to claim 1 wherein the olefin is propylene.

3. A process according to claim 1 wherein the catalyst is molybdenum.

4. A process according to claim 1 wherein the basic material contains a cation selected from the group consisting of alkali or alkaline earth metals and an anion seletced from the group consisting of hydroxide, carbonate, bicarbonate or oxide.

5. A process according to claim 1 wherein the basic material is an organic compound.

References Cited

UNITED STATES PATENTS

| | | | |
|---|---|---|---|
| 2,550,847 | 5/1951 | Mitchell et al. | 260—348 |
| 2,741,623 | 4/1956 | Millidge et al. | 260—348.5 |
| 3,351,635 | 11/1967 | Kollar | 260—348.5 |

NORMA S. MILESTONE, Primary Examiner